(12) United States Patent
Bruening

(10) Patent No.: US 7,885,944 B1
(45) Date of Patent: Feb. 8, 2011

(54) HIGH-ACCURACY CONFIDENTIAL DATA DETECTION

(75) Inventor: Oskar Bruening, Emeryville, CA (US)

(73) Assignee: Symantec Corporation, Mountain View, CA (US)

( * ) Notice: Subject to any disclaimer, the term of this patent is extended or adjusted under 35 U.S.C. 154(b) by 389 days.

(21) Appl. No.: 12/079,647

(22) Filed: Mar. 28, 2008

(51) Int. Cl.
*G06F 17/30* (2006.01)

(52) U.S. Cl. ......................................... 707/694; 726/26
(58) Field of Classification Search .................. 707/694, 707/827; 726/26, 27
See application file for complete search history.

(56) References Cited

U.S. PATENT DOCUMENTS

| | | | |
|---|---|---|---|
| 6,965,900 B2 * | 11/2005 | Srinivasa et al. ................... | 1/1 |
| 7,594,277 B2 * | 9/2009 | Zhang et al. ................... | 726/30 |
| 7,606,401 B2 * | 10/2009 | Hoffman et al. ............. | 382/124 |
| 7,613,659 B1 * | 11/2009 | Hoffman et al. ............... | 705/44 |
| 7,620,605 B2 * | 11/2009 | Hoffman et al. ............... | 705/52 |
| 2005/0091338 A1 * | 4/2005 | de la Huerga ................ | 709/217 |
| 2008/0010365 A1 * | 1/2008 | Schneider .................... | 709/223 |
| 2008/0184375 A1 * | 7/2008 | Nonaka et al. ................. | 726/27 |

* cited by examiner

*Primary Examiner*—Jean M Corrielus
(74) *Attorney, Agent, or Firm*—Blakely, Sokoloff, Taylor & Zafman LLP

(57) ABSTRACT

A method and apparatus for providing accurate detection of confidential information is described. In one embodiment, the method includes searching a text document for multiple classified data patterns associated with confidential information that is represented as personal identifiers. The method further includes finding, in the text document, one or more personal identifier candidates matching any of the classified data patterns, and validating each of the personal identifier candidates using one or more personal identifier validators to provide accurate detection of the confidential information in the text document.

19 Claims, 11 Drawing Sheets

| Name 702 | Purpose 704 | Details 706 |
|---|---|---|
| AbaCheckSum 706 | Validates the ABA® check digit and test for valid prefix | Must be 9 digits, check digit must match, first two digits must be one of the following: 00,01,02,03,04,05,06,07,08,09,10,11,12,21,22,23,24,25,26,27,28,29,30,31,32,61,62,63,6 4,65,66,67,68,69,70,71,72,80 and pass a position weighted checksum. |
| CusipCheck 708 | Validates the CUSIP® check digit and validate ranges | Match must have correct check digit and<br>○ must not start with '99'<br>○ must not be in the range xxx990 - xxx9ZZ<br>○ exact id must be all numbers 10-88 or 01, or not contain '0', '1', 'I', 'o' |
| ExcludeExactMatchCheck 710 | Validate that match is NOT part of a list | Compares the match with the list (case sensitive) and if the match is not part of the list, it's considered a valid match. |
| ExcludePrefixCheck 712 | Validate that match does not have prefix of a list | Checks whether the match has a prefix that's part of the input list. If it does not, the match is valid. |
| ExcludeProximityKeyword Check 714 | Validate that a certain set of keywords does not exist in the proximity of the match | Inverted version of the ProximityKeywordCheck. See that validator for more info. |
| ExcludeSuffixCheck 716 | Validate that match does not have suffix of a list | Checks whether the match has a suffix that's part of the input list. If it does not, the match is valid. |
| GlobalKeywordCheck 718 | Searches the whole message for a given list of keywords | Searches for any of the keywords listed in the input. The match is case insensitive. If any keyword matches the message is searched for valid patterns. |
| IpBasicCheck 720 | Confirm a valid IP address | all matches must be of the format "x.x.x.x" or the validator will return false. checks if each value is <256. |
| IpOctetCheck | Confirm a valid IP address, exclude all 1 digit matches (e.g. 1.1.1.2) | Confirm a valid IP address, exclude all all matches must be of the format "x.x.x.x" or the validator will return false. checks if each value is <256 and not be 1 digit matches (e.g. 1.1.1.2). |

FIG. 7 (cont.1 of 4)

| Name 702 | Purpose 704 | Details 706 |
|---|---|---|
| IpReservedCheck | First checks format (same as IpCheck), then checks whether the match is a generic IP address | Checks for IP addresses such as 127.0.0.1. If found the validator returns false. The invalid ranges checked for are defined here: bogons<sup>a</sup>. Examples:<br><br>Invalid ranges are:<br>10.0.0.0 - 10.255.255.255 - reserved for intranet local networks<br>127.0.0.0 - 127.255.255.255 - reserved for local loop on each computer<br>172.16.0.0 - 172.31.255.255 - reserved for intranet local networks<br>192.168.0.0 - 192.168.255.255 - reserved for intranet local networks<br>224.0.0.0 - 239.255.255.255 - used for multicast routing<br>0.0.0.0 - 2.255.255.255<br>5.0.0.0 - 5.255.255.255<br>7.0.0.0 - 7.255.255.255<br>23.0.0.0 - 23.255.255.255 |
| Iso7064Mod9710Checker | Computes the ISO 7064 Mod 97-10 Checksum | Computes the ISO 7064 Mod 97-10 checksum of the complete match. Used for IBAN numbers. |
| LuhnCheck 722 | Computes the Luhn checksum <sup>a</sup> | Computes the Luhn checksum of the complete match. |
| NumberDelimiterEnvironment Check 724 | Checks the surrounding of the match remove possible false positives | Assumes that the pattern has several groups with delimiter between them and that the pattern consists of all numbers. It first searches the pattern for the delimiter. If no delimiter is found, the match is consider good. Otherwise we check whether the delimiter also proceeds or follows the match and if so if a number is before or after that delimiter. If so, it's probably a false positive. Examples (curly brackets indicate match, DigitsOnly used as normalizer):<br><br>• {2222} = true<br>• 2 {2222} = true<br>• a {22 22} = true<br>• {2222} 2 = true<br>• {22 22} a = true<br>• {22-22} 2 = true<br>• {22 22}-2 = true<br>• 2 {22 22} = false (false positive)<br>• {22 22} 2 = false (false positive) |

FIG. 7 (cont. 2 of 4)

| Name 702 | Purpose 704 | Details 706 |
|---|---|---|
| PrefixCheck 726 | Checks whether the match has any of specified prefixes | no normalization, case-sensitive. Any characters are valid, commas cannot be part of the pattern. |
| ProximityKeywordCheck 728 | Search for given keywords in the proximity of the match | Searches for keywords case insensitively in the proximity of 30 characters before and after the match. The proximity range can be customized by adding a positive integer as the first value in the input. Example "abc,def" will search in 30 character proximity for abc and def. "50,abc,def" will search for abc and def in 50 character proximity. |
| RequireExactMatchCheck | Checks whether the match is part of a given list | This validator is not really recommended to be used. If the exact value is known, a keyword rule is probably more appropriate. |
| SameDigitCheck 730 | Checks if all digits/characters are not the same | Validates a match if not all characters in a given match are the same:<br>• "2222" = invalid<br>• "2224" = valid |
| SsnAdvancedCheck 732 | Checks for correct SSN format, and common test ssns: | Same as the SsnBasicCheck, plus checking whether match is not any of the following:<br>• number cannot start with 666<br>• number cannot start with 000<br>• number cannot consist of all the same digits (e.g. 111-11-1111)<br>• number cannot be reserved for advertising: 123-45-6789, 987-65-432x |
| SsnBasicCheck 734 | Checks for correct SSN format | Must be 9 digits (separators are ignored), otherwise the pattern is invalid if<br>• it has all zeros in any section<br>• the first section is bigger than 772<br>• the match has two different delimiters between the groups |

FIG. 7 (cont. 3 of 4)

| Name 702 | Purpose 704 | Details 706 |
|---|---|---|
| SsnGroupingNumberCheck 736 | Checks for valid SSN Group Number | The first group in an SSN is the Area Number (3 digits), the next group is the Group Number (2 digits). The group number ranges from 01 to 99, and are assigned in a particular order (not consecutive). This validator checks whether the group number of a given SSN is in the valid range for that SSN's area number. The list of highest assigned group numbers comes from here: http://www.ssa.gov/employer/highgroup.txt[a] |
| SuffixCheck 738 | Checks whether the match ends in specified suffixes | no normalization, case-sensitive. Any characters are valid, commas cannot be part of the pattern |
| UKDriversLicenseCheck 740 | Match must be possible UK DL# | • Match must be 16 characters,<br>• The digits in the 8th + 9th position must be > 00 and < 32 |
| UkNhsCheck 742 | Validates NHS check digit | Computes the UK NHS checksum. |

FIG. 7 (cont. 4 of 4)

HIGH-ACCURACY CONFIDENTIAL DATA DETECTION

FIELD OF INVENTION

Embodiments of the invention relate to the field of processing data, and more particularly, to providing accurate detection of confidential information.

BACKGROUND OF THE INVENTION

A modern organization typically maintains a data storage system to store and deliver records concerning various significant business aspects of the organization. Stored records may include data on customers (or patients), contracts, deliveries, supplies, employees, manufacturing, or the like. Stored records are typically hosted by a computer connected to a local area network (LAN). This computer is usually made accessible to the Internet via a firewall, router, or other packet switching devices. Although the accessibility of the records via the network provides for more efficient utilization of information, it also poses security problems due to the highly sensitive nature of this information. In particular, because access to these records is essential to the job function of many employees in the organization, there are many possible points of potential theft or accidental distribution of this information. Theft of information represents a significant business risk both in terms of the value of the intellectual property as well as the legal liabilities related to regulatory compliance.

A significant part of confidential information consists of well defined personal identifiers such as credit card numbers, social security numbers, account numbers, employee numbers, customer or patient numbers, IP addresses, driver license numbers, license plate numbers, etc. These personal identifiers typically contain digits and numbers grouped together in a well defined format. However, for each personal identifier, the format may have multiple variations. For example, a social security number may be written as a nine digit number or may have spaces or dashes as delimiters. A credit card number may have up to 35 variations. Except for these variations, the format is usually very rigid, consisting of a fixed number of digit and letter combinations in a certain order.

Existing pattern detection technologies, such as regular expression implementations, are not optimized towards the rigid pattern formats and their variations. As a result, memory or CPU performance might decrease with the high number of variations. In addition, existing pattern detection technologies are not very accurate and produce a significant number of false positives.

SUMMARY OF THE INVENTION

A method and apparatus for providing accurate detection of confidential information is described. In one embodiment, the method includes searching a text document for multiple classified data patterns associated with confidential information that is represented as personal identifiers. The method further includes finding, in the text document, one or more personal identifier candidates matching any of the classified data patterns, and validating each of the personal identifier candidates using one or more personal identifier validators to provide accurate detection of confidential information in the text document.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 7 illustrates exemplary validators for eliminating false positives in accordance with some embodiments.

DETAILED DESCRIPTION OF THE PRESENT INVENTION

Figure 1:
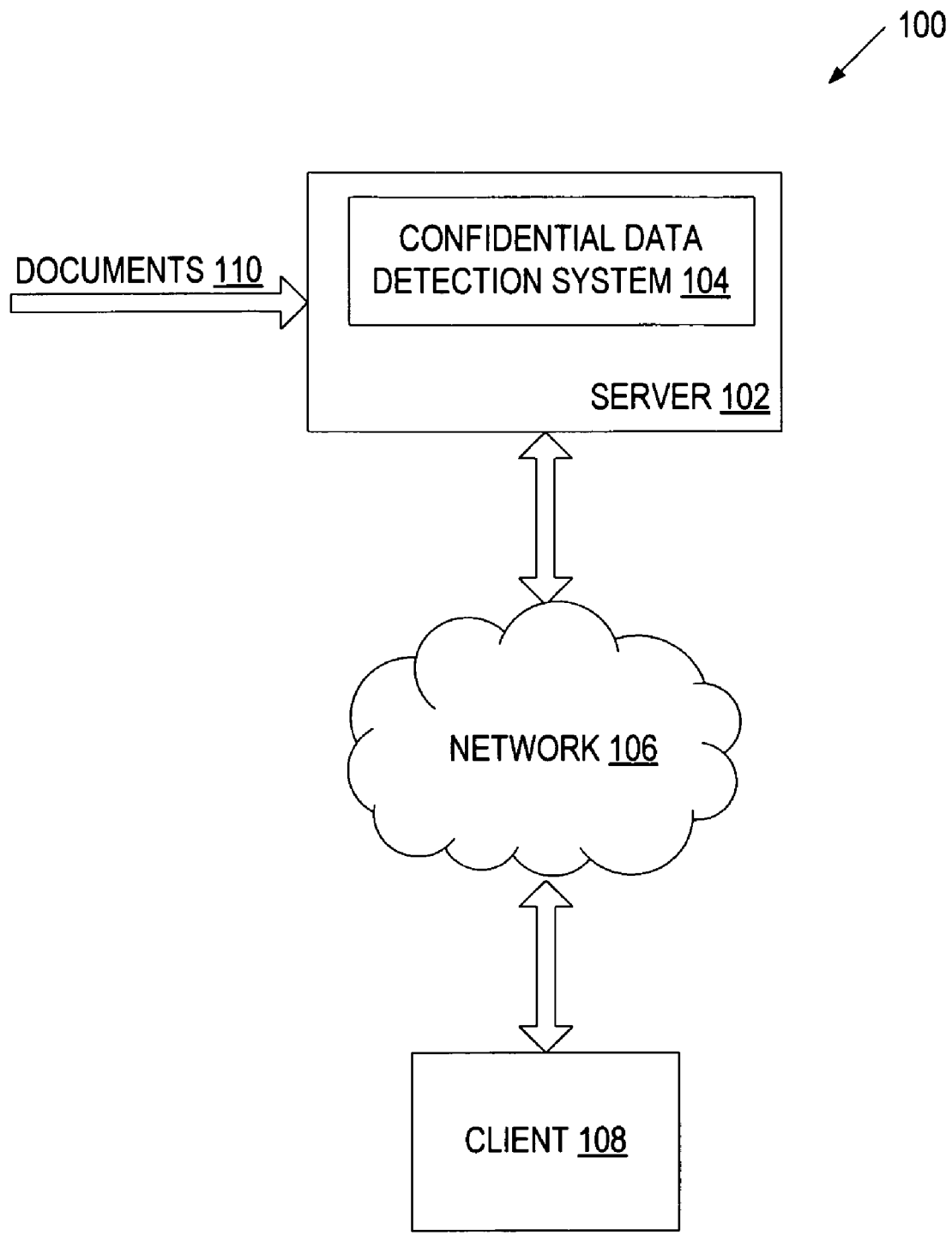
FIG. 1 illustrates an exemplary network architecture in which embodiments of the invention may operate.

A system and method for providing accurate confidential data detection is described. The system may include a search engine and a validation engine. The search engine may receive a text document (e.g., a message being transmitted over a network or a message stored in a database or cache), and search this text document for multiple classified data patterns associated with confidential information that is represented as personal identifiers. Examples of personal identifiers may include credit card numbers, social security numbers, account numbers, employee numbers, IP addresses, driver license numbers, license plate numbers, etc. The classified data patterns include format variations of specific data identifiers. As a result of the search, the search engine may find one or more personal identifier candidates matching any of the classified data patterns, and may pass these personal identifier candidates to the validation engine. The validation engine applies a list of validators to the personal identifier candidates to eliminate false positives and provide accurate detection of confidential information in the text document.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 is a block diagram of exemplary network architecture 100 in which embodiments of the invention may operate. The network architecture 100 may include one or more client devices (including client 108), a server 102 and a network 106.

The server 102 may be part of an organization's network and may be able to watch traffic such as incoming and outgoing messages (e.g., using the tap). Optionally, the server 102 may be able not only watch traffic but also intercept and re-route messages so that their ultimate destination is changed. Messages can be transported using various protocols (e.g., simple mail transfer protocol (SMTP), hypertext transfer protocol (HTTP), file transfer protocol (FTP), AOL Instant Messaging (AIM), ICQ, single object access protocol (SOAP), SQLNet, transmission control protocol/Internet protocol (TCP/IP), user datagram protocol (UDP), Ethernet, 802.11, etc.).

Alternatively, the server 102 may not watch traffic but instead have access to one or more data repositories that may potentially store documents with confidential information. Yet alternatively, the server 102 may be able to both watch traffic and have access to the data repositories.

The server 102 may be coupled to one or more clients 108 via the network 103, which may be a public network (e.g., Internet) or a private network (e.g., Ethernet, a Local Area Network (LAN), or a corporate intranet). The client 108 may be operated by an employee of the organization (e.g., a system administrator, a business analyst, etc.) and may be, for example, a personal computer (PC), a mobile phone, a palm-sized computing device, a personal digital assistant (PDAs), and the like.

In one embodiment, the server 102 hosts a confidential data detection system 104. The confidential data detection system 104 detects confidential information in documents containing free-form text. These documents may be, for example, transported messages (e.g., email messages, web mail message, instant messages, etc.) and/or documents stored in data repositories. The confidential data detection system 104 detects confidential information in the form of personal identifiers such as credit card numbers, social security numbers, account numbers, employee numbers, IP addresses, driver license numbers, license plate numbers, etc.

The confidential data detection system 104 searches documents based on classified data formats of personal data identifiers, rather than their actual values. In other words, the confidential data detection system 104 searches for data that looks like a personal identifier, without knowing the value of the personal identifier. A personal identifier may have multiple format variations. As will be discussed in more detail below, the confidential data detection system 104 is optimized to search the document for multiple format variations in an inexpensive and efficient manner.

Once the confidential data detection system 104 detects potential matches of personal identifiers, the confidential data detection system 104 validates the potential matches to eliminate false positives. In particular, the confidential data detection system 104 applies a list of validators to the potential matches and determines which of the potential matches are likely to be valid personal identifiers. The validators may include, for example, checksum algorithms, checks against valid (or invalid) ranges of numbers within a potential match, checks for a valid prefix or suffix of a potential match, checks for valid digits or number of digits within a potential match, search of the document for one or more keywords, etc. The confidential data detection system 104 then reports the personal identifiers detected in the document to an appropriate entity such as a user (e.g., system administrator) of the client 108.

In one embodiment, the user of the client 108 can provide input to configure the confidential data detection system 104. Specifically, the user of the client 108 can change the list of validators to be used by the confidential data detection system 104. In addition, the user of client 108 can modify the list of personal identifier patterns based on the specific requirements of the user's organizations. For example, the user may add a data pattern for newly implemented employee numbers and may add some validators for this data pattern to the existing list of validators. The user can provide the above input via a graphical user interface (GUI) provided by the data detection system 104, or by entering a designated command recognizable by an application program interface (API) of the data detection system 104, or by updating a configuration file (e.g., formatted in text or XML) used by the data detection system 104.

It should be noted that although the network architecture of FIG. 1 illustrates the confidential data detection system 104 as part of the server 102, it is not a requirement. Instead, the confidential data detection system 104 may reside on the client 108 to detect confidential data in messages transported to and from the client 108 and in documents stored on the client 108 (e.g., in memory, cache, etc.). In addition, the confidential data detection system 104 can operate on more than one machine and perform additional functionality not described herein.

Figure 2:
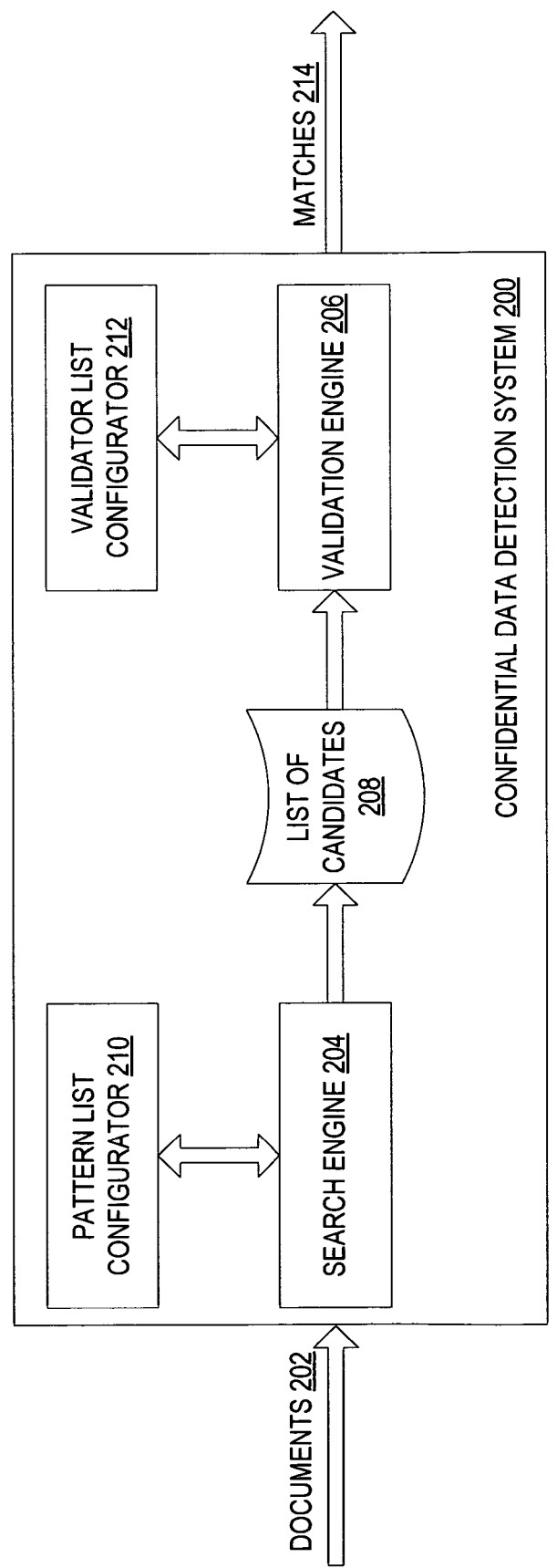
FIG. 2 is a block diagram of one embodiment of a confidential data detection system.

FIG. 2 is a block diagram of one embodiment of a confidential data detection system 200. The confidential data detection system 200 may include a search engine 204 and a validation engine 206.

The search engine 204 searches documents 202 for data resembling personal identifiers such as credit card numbers, social security numbers, account numbers, employee numbers, IP addresses, driver license numbers, license plate numbers, etc. The search is performed using classified data patterns that include rigid pattern formats of personal identifiers and their variations. The classified data patterns used by the search engine 204 are configurable by a pattern list configurator 210. The pattern list configurator 210 may be a GUI facilitating user input of data patterns or an API that receives user-specified data patterns via a designated command. Alternatively, the pattern list configurator 210 may represent a configuration file (e.g., text or XML) that can be modified by the user to add new data patterns or delete or change existing data patterns.

In one embodiment, the search engine 204 uses a finite state machine (FSM) generated from a configuration of all variations of a given identifier format. A single FSM may be used for all data patterns associated with a specific personal identifier, allowing parallel search for all variations of the personal identifier's format. Alternatively, a single FSM may be used for data patterns of all personal identifiers, allowing parallel search for variations of all personal identifiers' formats. As will be discussed in more detail below, the search engine 204 may use a set of bitmasks to track progress of parallel searching and to detect found matches.

Once the search engine 204 completes the search of the document, the search engine 204 compiles a list 208 of detected personal identifier candidates and passes the list 208 to the validation engine 206. The detected personal identifier candidates include matches that have a specific format of a personal identifier and may potentially constitute a valid personal identifier. However, because the search was not performed for the actual value of a personal identifier but rather for a matching data pattern, there is a chance that one or more of these candidates were detected due to insufficient accuracy of pattern detection.

The validation engine 206 validates each personal identifier candidate from the list 208 separately. In particular, the validation engine 206 applies multiple validators to each personal identifier candidate from the list 208 and eliminates personal identifier candidates that are likely to constitute false positives, producing a set of final matches 214. The validators may include, for example, checksum algorithms, checks against valid (or invalid) ranges of numbers within a potential match, checks for a valid prefix or suffix of a potential match, checks for valid digits or number of digits within a potential match, search of the document for one or more keywords, etc.

In one embodiment, the list of validators used by the validation engine 206 is configurable by a validator list configurator 212. The validator list configurator 212 may be a GUI facilitating user input of validators or an API that receives user-specified validators via a designated command. Alternatively, the pattern list configurator 210 represents a configuration file (e.g., text or XML) that can be modified by the user to add new validators or delete or change existing validators.

Figure 3:
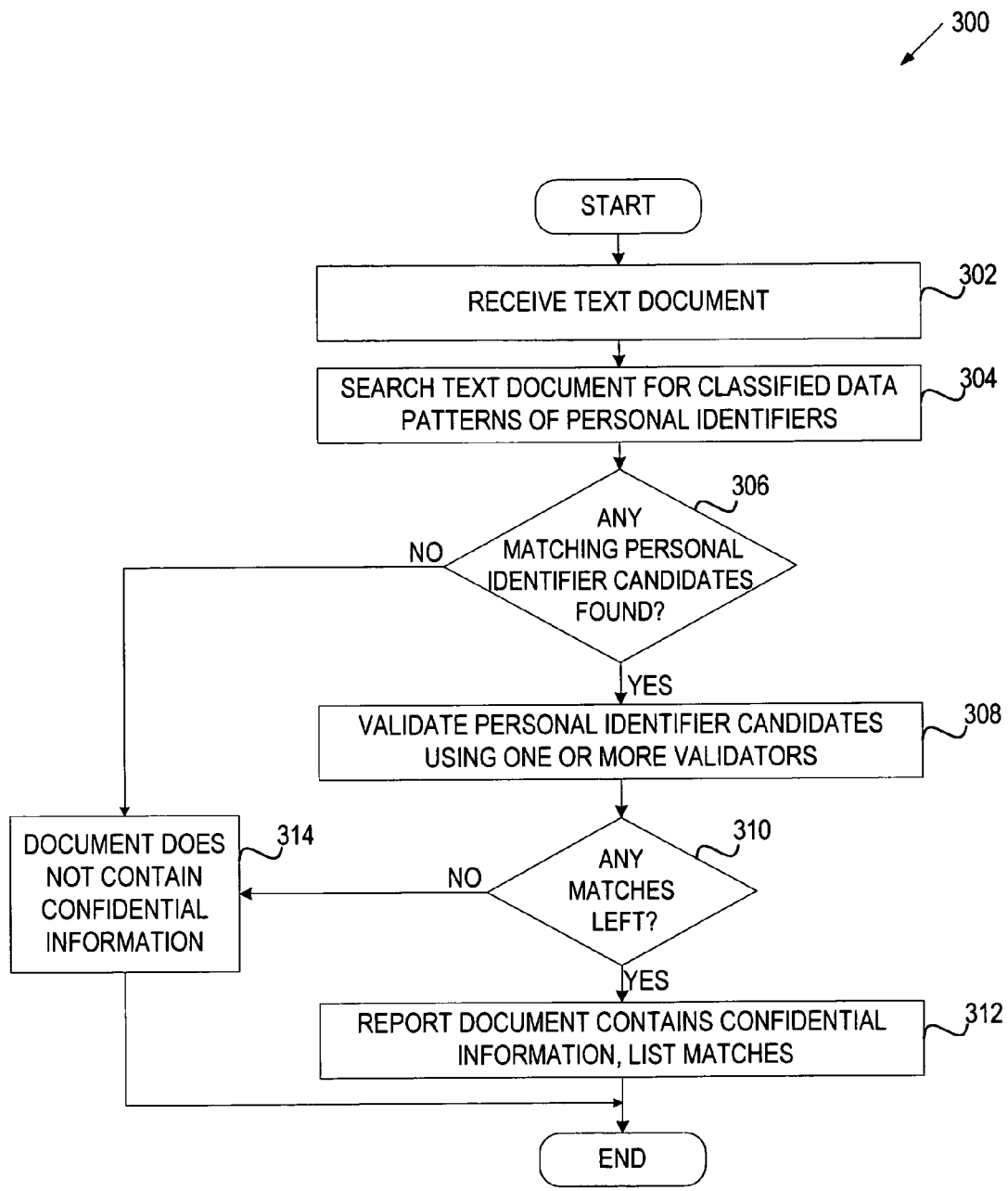
FIG. 3 is a flow diagram of one embodiment of a method for providing accurate detection of confidential information.

FIG. 3 is a flow diagram of one embodiment of a method 300 for providing accurate detection of confidential information. The method 300 is performed by processing logic that may comprise hardware (circuitry, dedicated logic, etc.), software (such as is run on a general purpose computer system or a dedicated machine), or a combination of both. In one embodiment, the method 300 is performed by a data detection system (e.g., confidential data detection system 104 of FIG. 1).

Referring to FIG. 3, processing logic begins with receiving a document that includes free-form text (block 302). The document may be a transported message (e.g., an email message, a web mail message, an IM message, etc.) or a message or document stored in a data store (e.g., memory, cache, etc.).

At block 304, processing logic searches the document for data that resembles personal identifiers such as credit cards, social security numbers, IP addresses, etc. Processing logic performs the search using classified data patterns associated with the personal identifiers. One embodiment of a method for searching content based on classified data patterns will be discussed in more detail below in conjunction with FIG. 5.

If any matching personal identifier candidates are found (block 306), processing logic validates these candidates using validators. The validators may be configured by the user to satisfy specific requirements. The validators may include, for example, checksum algorithms, checks against valid (or invalid) ranges of numbers within a potential match, checks for a valid prefix or suffix of a potential match, checks for valid digits or number of digits within a potential match, search of the document for one or more keywords, etc. One embodiment of a method for validating detected personal identifier candidates will be discussed in more detail below in conjunction with FIG. 5.

If any of the detected personal identifier candidates are valid (block 310), processing logic reports to an appropriate entity that the document contains confidential information and provides a list of validated matches (block 310). If all candidates found at block 308 are invalid or the search performed at block 304 did not produce any matches, processing logic determines that the document does not contain confidential information in the form of personal identifiers (block 314). Hence, no actions (e.g., reporting the document or preventing the document from reaching an intended destination) need to be taken with respect to this message.

It should be noted that although method 300 is described in the context of confidential information and personal identifiers in particular, method 300 may be used for detecting data resembling any other rigid pattern identifiers without loss of generality.

Figure 4:
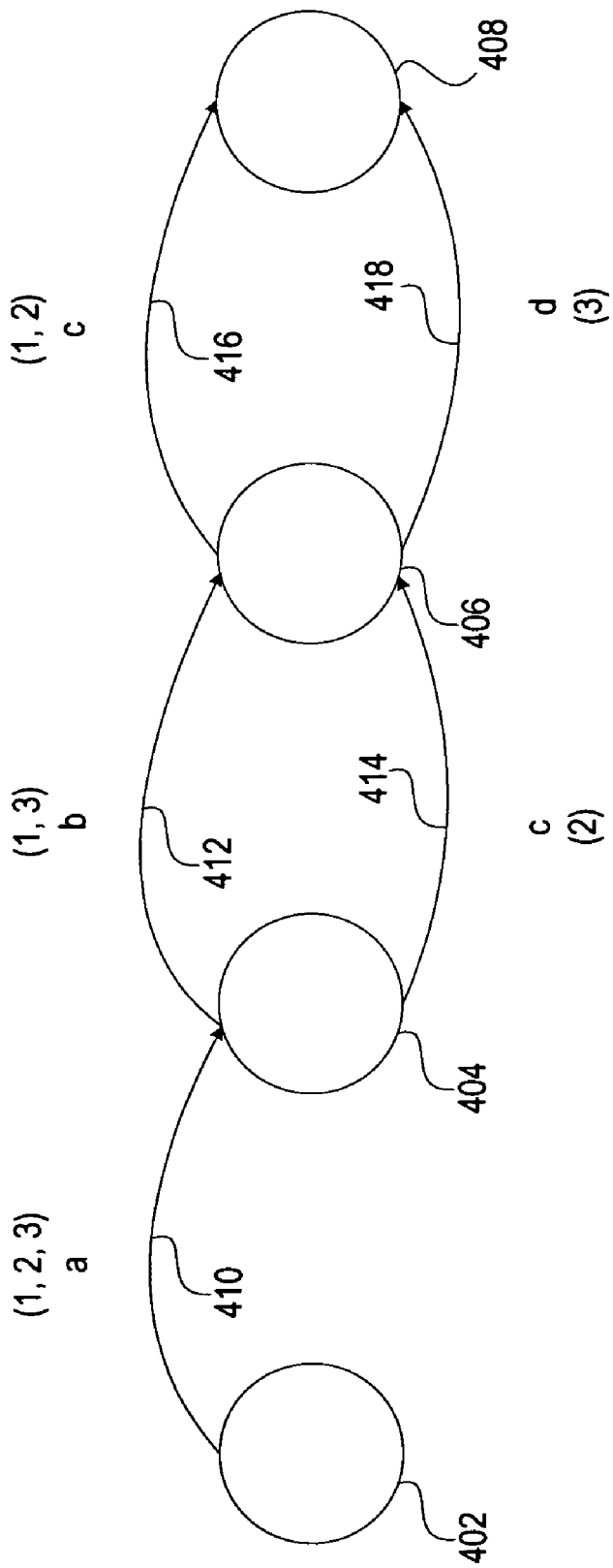
FIG. 4 illustrates operation of an exemplary finite state machine in accordance with some embodiments.

FIG. 4 illustrates operation of an exemplary finite state machine (FSM) used for detecting personal identifiers in accordance with some embodiments. Specifically, instead of maintaining a separate FSM for each variation of a personal identifier format, a single FSM may be generated from a configuration of all the variations of a given personal identifier format. In such a FSM, the number of nodes and transitions is minimized by sharing across variations. Within the FSM, each transition from one node to the next node corresponds to a character in the pattern variations. Nodes are linked through these transitions in a chain for each of the pattern variations, without circular paths. Hence, multiple transitions with the same source and destination nodes but with different characters as transition conditions may exist.

As shown in FIG. 4, FSM includes nodes 402, 404, 406 and 408 that are linked together via transitions to satisfy pattern variations 1, 2 and 3. Pattern 1 ("abc") is associated with transition links 410, 412 and 416. Pattern 2 ("acc") is associated with transition links 410, 414 and 416. Pattern 3 ("abd") is associated with transition links 410, 412 and 418. In other words, transition link 410 is associated with patterns 1, 2 and 3. Transition link 412 is associated with patterns 1 and 3. Transition link 414 is associat6ed with pattern 2. Transition link 416 is associated with patterns 1 and 2, and transition link 418 is associated with pattern 3.

To keep track of the above associations, a set of bitmasks is maintained. In particular, every pattern variation is associated with its own unique bitmask. Every transition link has a bitmask associated with pattern variations that share this transition. In addition, every node also has a bitmask associated with pattern variations exiting at this node. By utilizing the above bitmasks, nodes and transitions can be shared within an FSM, optimizing the detection technique towards fixed-length pattern variations. This creates a memory efficient FSM of nodes chained in together, minimizing the number of nodes and transitions used, independent of the number of pattern variations to be matched. For rigid pattern variations, the number of nodes, and therefore its memory consumption, is directly related to the number of characters used in the longest variation. Any number of variations can be added to the FSM without any further impact on memory utilization. Similarly, CPU performance during detection is independent of the number of variations searched for and can be described as O(n), where n is the number of characters in the text being analyzed. In addition, all pattern variations represented in this FSM can be searched for in parallel without performance impact, significantly reducing the detection time.

In one embodiment, in order to support variable-length pattern variations, transitions can also be added which will point to nodes that are not currently in the chain, and thus creating a tree structure. As a result, multiple transitions can leave the same node with the same character and even the same variation associated with them, where each of these transitions points to a different node.

Figure 5:
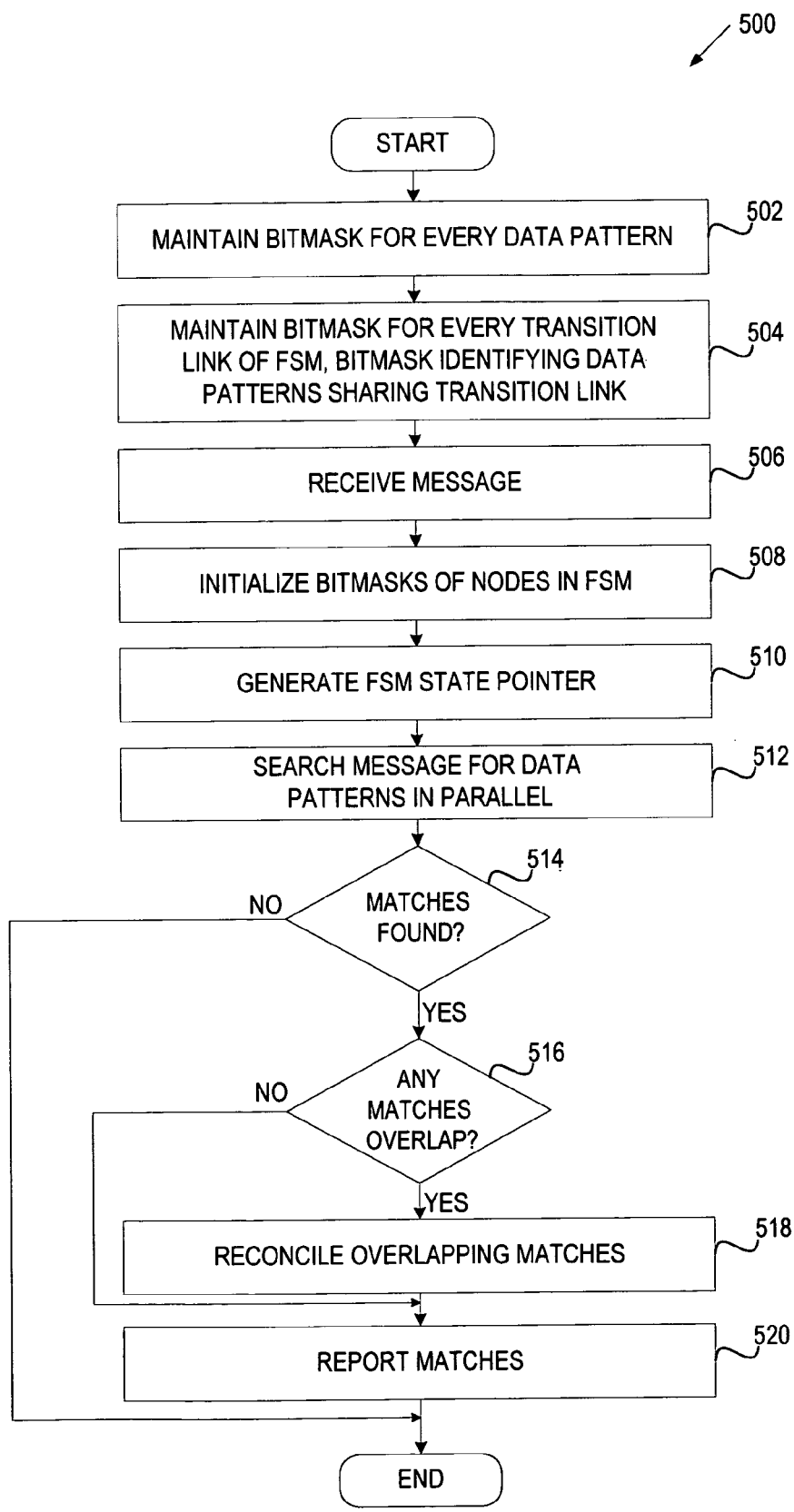
FIG. 5 is a flow diagram of one embodiment of a method for detecting personal identifier candidates in a document.

FIG. 5 is a flow diagram of one embodiments of a method 500 for optimized detection of personal identifiers. The method 500 is performed by processing logic that may comprise hardware (circuitry, dedicated logic, etc.), software (such as is run on a general purpose computer system or a dedicated machine), or a combination of both. In one embodiment, the method is performed by a data detection system (e.g., confidential data detection system 104 of FIG. 1).

Referring to FIG. 5, method 500 begins with processing logic maintaining a bitmask for every pattern variation (block 502) and a bitmask for every transition link of FSM (block 504). As discussed above, a bitmask associated with a transition link identifies pattern variations sharing the transition link. In addition, a bitmask is maintained for each node to identify pattern variations exiting at this node.

Upon receiving a message (block 506), processing logic initializes bitmasks associated with nodes of the FSM (block 508), generates an FSM state pointer (block 510), and starts searching the message for pattern variations in parallel (block 512). The state pointer may include a list of currently valid nodes and a bitmask associated with these nodes, indicating the remaining valid pattern variations.

As the search progresses through the text of the message, a list of all currently valid nodes with the remaining valid pattern variations is maintained. With each character from the text, the state pointer also moves from node to node in the FSM. With each transition taken, the associated bitmask is used to filter the remaining valid variations. If a node has an exit bitmask partially or completely matching the bitmask of the state pointer, then a corresponding collection of characters from the text is found to be a match. In this case, the match is added to a list of matches, and the search proceeds.

Once the search of the message is completed, processing logic determines whether any matches have been detected (block 514). If not, method 500 ends. If so, processing logic further determines whether any of the detected matches overlap (block 516). If not, method 500 proceeds to block 520 to report detected matches. If so, processing logic first reconciles the overlapping matches (e.g., in favor of the longer match) (block 518), and then reports resulting matches (block 520).

Figure 6:
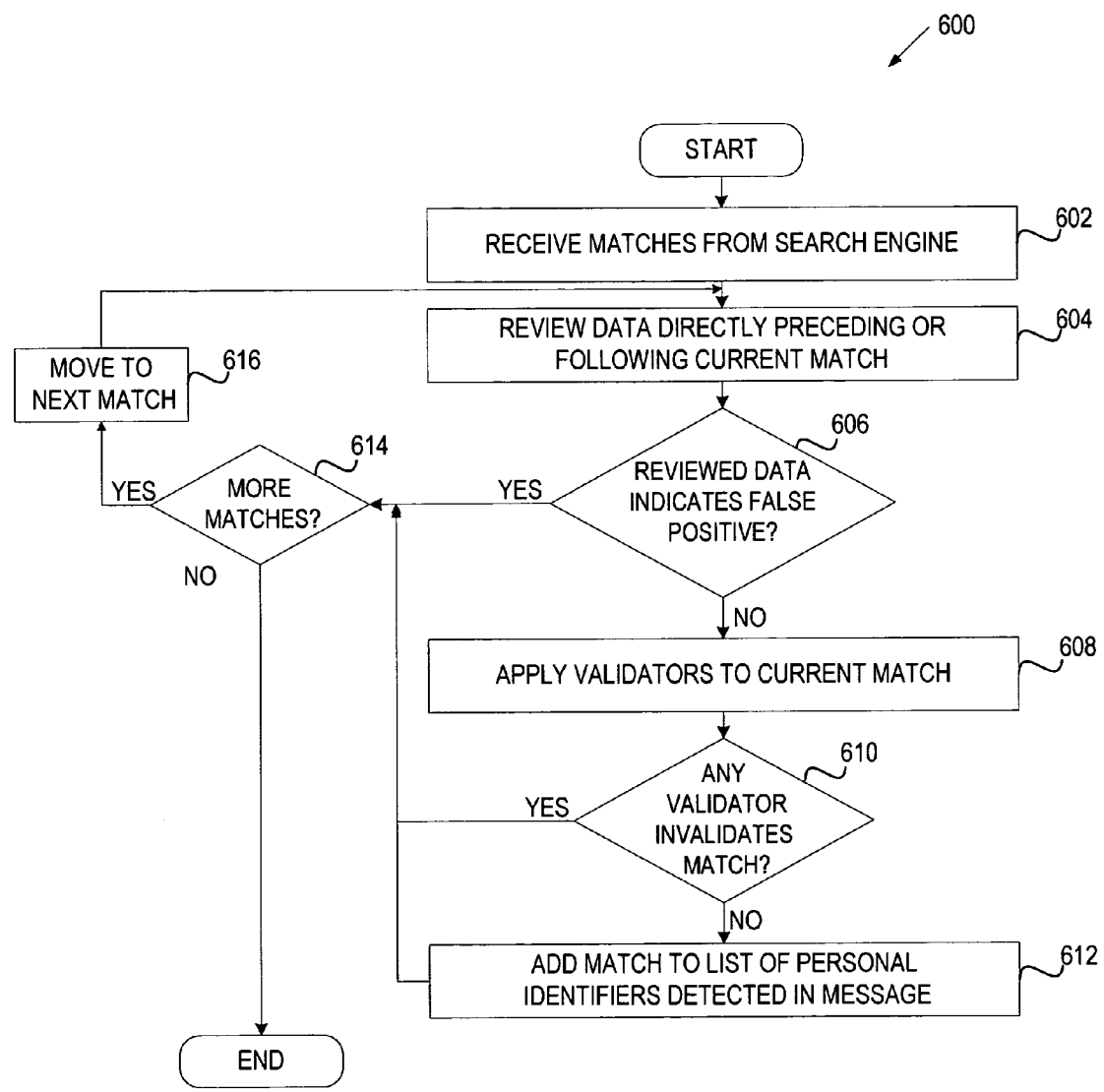
FIG. 6 is a flow diagram of one embodiment of a method for validating personal identifier candidates.

FIG. 6 is a flow diagram of one embodiment of a method for validating detected personal identifier candidates. The method is performed by processing logic that may comprise hardware (circuitry, dedicated logic, etc.), software (such as is run on a general purpose computer system or a dedicated machine), or a combination of both. In one embodiment, the method is performed by a data detection system (e.g., confidential data detection system 104 of FIG. 1).

Referring to FIG. 6, processing logic begins with receiving a list of detected personal identifier candidates referred to herein as matches (block 602) and accessing the first match in the list. At block 604, processing logic performs preliminary validation based on data directly surrounding the match. In particular, processing logic reviews data immediately preceding or following the match. If the data directly preceding the match or data directly following the match includes a letter or numbers (as opposed to spaces or punctuation marks), then the match is a false positive. If the surrounding data indicates a false positive (block 606), processing logic moves to the next match (block 616) given that the list of matches has not been exhausted (block 614), and returns to block 604.

If the preliminary validation does not invalidate the current match, processing logic applies relevant validators to the match (block 608). Relevant validators may include validators intended for a given personal identifier (e.g., credit card number as opposed to IP address). Exemplary validators will be discussed in more detail below in conjunction with FIG. 7.

If any of the applied validators invalidate the match (block 610), personal logic adds the match to a list of personal identifiers detected in the message, and proceeds to block 614. If not, processing logic proceeds to block 614 directly. If all matches have been processed, method 600 ends.

FIG. 7 illustrate a table 700 including exemplary validators used for high-accuracy confidential data detection in accordance with some embodiments. Table 700 lists names 702 of individual validators, describes purpose 704 of individual validators, and provides detailed description 705 of individual validators.

As discussed above, an individual validator may be, for example, a checksum algorithm, a check against valid ranges of numbers within a personal identifier candidate, a check against invalid ranges of numbers within a personal identifier candidate, a check against invalid personal identifiers, a check for a valid prefix of a personal identifier candidate, a check for a valid suffix of a personal identifier candidate, a check for a valid format of a personal identifier candidate, a check for valid digits within a personal identifier candidate, a check for a valid number of digits or characters within a personal identifier candidate, or a search of the document for one or more keywords. Some validators combine multiple operations. For example, validator 706 performs a checksum and checks for a valid prefix of the candidate, and validator 708 performs a checksum and checks for valid digits of the candidate. Validator 710 checks whether the candidate is not part of invalid identifiers. Validators 714 and 728 verify that a certain set of keyword does not exist in the message in the proximity to the candidate. Validators 716 and 738 check for a valid suffix of the candidate. Validator 718 checks the messages for a given list of keyword, and if any keyword is found, it checks the candidate for valid patterns. Validator 720 pertains to an IP address and checks whether the format of the IP address is valid and its value is below a predefined number. Validator 722 is a checksum algorithm known as Luhn checksum. Validator 724 checks for specific combinations in candidates including a delimiter (e.g., space). Validator 726 checks for a valid prefix of the candidate. Validator 730 verifies that all characters or digits of the candidate are not the same. Validators 732, 734 and 736 pertains to social security numbers and check for their valid format and valid group number. Validator 740 pertains to U.K. driver license numbers and checks whether the candidate is a valid U.K. driver license number. Validator 742 pertains to U.K. National Health Service (NHS) identifiers and tests the candidate's U.K. NHS checksum.

Figure 8:
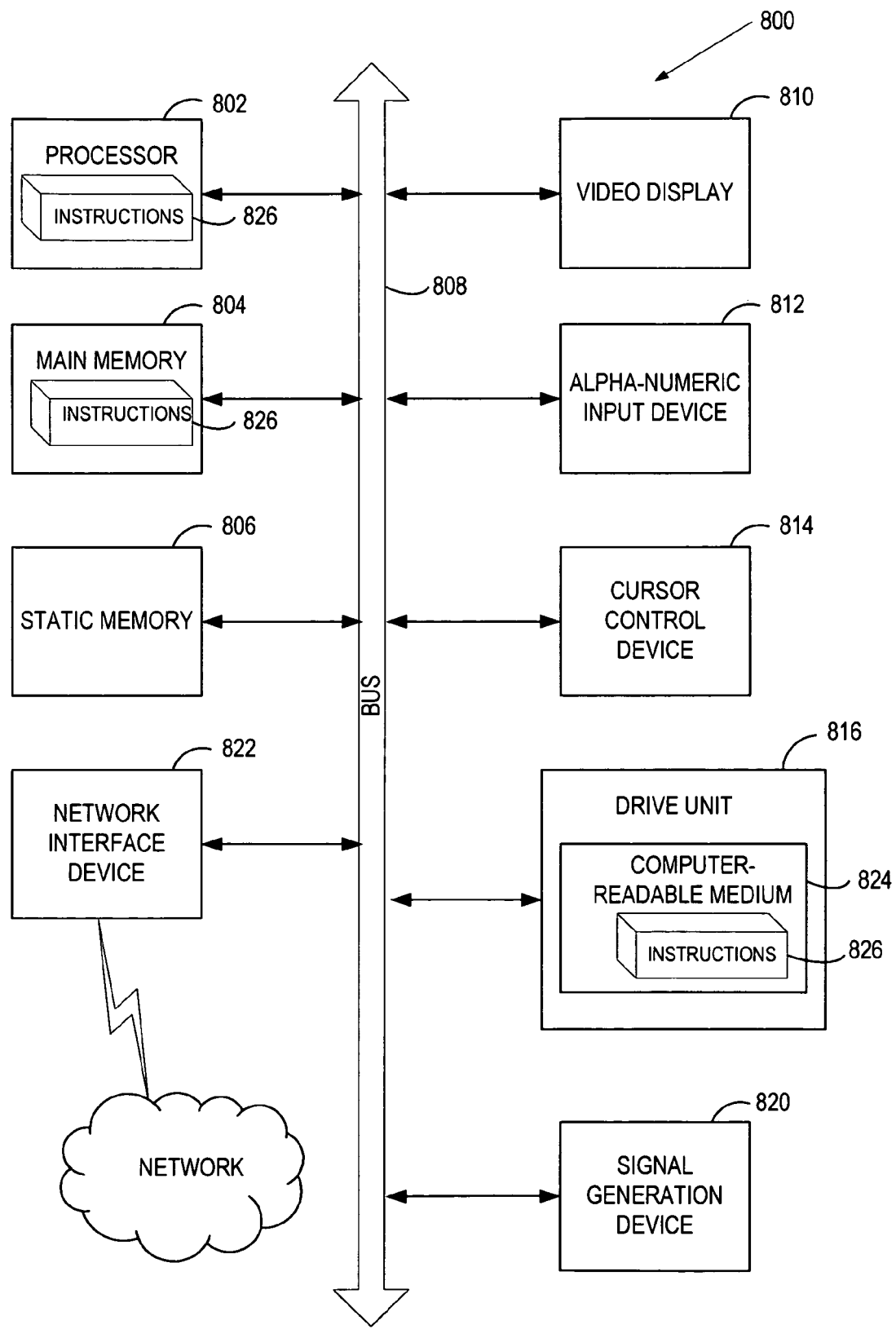
FIG. 8 is a block diagram of an exemplary computer system that may perform one or more of the operations described herein.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device (processor) 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 830.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 may also be one or more special-purpose processing devices such as an application specific integrated circuit (ASIC), a field programmable gate array (FPGA), a digital signal processor (DSP), network processor, or the like. The processor 802 is configured to execute the processing logic 826 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-accessible storage medium 830 on which is stored one or more sets of instructions (e.g., software 822) embodying any one or more of the methodologies or functions described herein. The software 822 may also reside, completely or at least partially, within the main memory 804 and/or within the processor 802 during execution thereof by the computer system 800, the main memory 804 and the processor 802 also constituting machine-accessible storage media. The software 822 may further be transmitted or received over a network 820 via the network interface device 808.

While the machine-accessible storage medium 830 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical media, and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

I claim:

1. A computer-implemented method comprising:
    storing, in memory, a plurality of classified data patterns for personal identifiers, the plurality of classified data patterns corresponding to variations of personal identifier formats, the personal identifiers including confidential information of a plurality of entities;
    identifying a text document to be searched;
    searching the text document for data expressed in a format that matches any of the plurality of classified data patterns corresponding to the variations of personal identifier formats;
    finding, in the text document, one or more sets of data having the format that matches any of the plurality of classified data patterns, each found set of data representing a possible candidate of a personal identifier; and
    validating each of the found sets of data from the text document using one or more personal identifier validators to determine whether the found set of data is a personal identifier or a false positive, wherein validating each of the found sets of data from the text document comprises:
    eliminating false positives based on data immediately preceding or following each of the personal identifier candidates, wherein the data immediately preceding or following a personal identifier candidate indicates a false positive if the personal identifier candidate is immediately preceded, or immediately followed by, a number or a letter.

2. The method of claim 1 wherein the personal identifiers comprises one or more of a credit card number, a social security number, an account number, an employee number, a customer or patient number, an IP address, a driver license number, and a license plate number.

3. The method of claim 1 wherein a list of the plurality of classified data patterns is configurable based on user input.

4. The method of claim 1 wherein a list of the validators is configurable based on user input.

5. The method of claim 1 wherein searching the text document comprises:
performing a search for the plurality of classified data patterns in parallel using a single finite state machine (FSM) and a set of bitmasks.

6. The method of claim 5 wherein the set of bitmasks comprises:
bitmasks associated with the plurality of classified data patterns;
bitmasks associated with a plurality of transition links of the FSM, the bitmasks identifying classified data patterns that share a relevant transition link; and
bitmasks associated with a plurality of nodes of the FSM, each bitmask identifying data patterns exiting at a relevant node.

7. The method of claim 1 wherein finding, in the text document, one or more sets of data having the format that matches any of the plurality of classified data patterns comprises:
finding a plurality of matches; and
if any of the plurality of matches overlap, reconcile overlapped matches.

8. The method of claim 1 wherein validating each of the found sets of data from the text document comprises:
applying a list of validators to remaining candidates to eliminate additional false positives.

9. The method of claim 1 wherein the validators comprise one or more of a checksum algorithm, a check against valid ranges of numbers within a personal identifier candidate, a check against invalid ranges of numbers within a personal identifier candidate, a check against invalid personal identifiers, a check for a valid prefix of a personal identifier candidate, a check for a valid suffix of a personal identifier candidate, a check for a valid format of a personal identifier candidate, a check for valid digits within a personal identifier candidate, a check for a valid number of digits or characters within a personal identifier candidate, or a search of the document for one or more keywords.

10. A system comprising:
a memory to store a plurality of classified data patterns for personal identifiers, the plurality of classified data patterns corresponding to variations of personal identifier formats, the personal identifiers including confidential information of a plurality of entities;
a processor, coupled to the memory;
a search engine, executed from the memory by the processor, to identify a text document to be searched, to search the text document for data expressed in a format that matches any of the plurality of classified data patterns corresponding to the variations of personal identifier formats, and to find, in the text document, one or more sets of data having the format that matches any of the plurality of classified data patterns, each found set of data representing a possible candidate of a personal identifier; and
a validation engine, coupled to the search engine, to validate each of the found sets of data from the text document using one or more personal identifier validators to determine whether the found set of data is a personal identifier or a false positive, wherein the validation engine is to validate each of the found sets of data from the text document based on eliminating false positives based on data immediately preceding or following each of the personal identifier candidates, wherein the data immediately preceding or following a personal identifier candidate indicates a false positive if the personal identifier candidate is immediately preceded, or immediately followed by, a number or a letter.

11. The system of claim 10 wherein:
the personal identifiers comprises one or more of a credit card number, a social security number, an account number, an employee number, a customer or patient number, an IP address, a driver license number, and a license plate number;
a list of the plurality of classified data patterns is configurable based on user input; and
a list of the validators is configurable based on user input.

12. The system of claim 10 wherein the search engine is to perform a search for the plurality of classified data patterns in parallel using a single finite state machine (FSM) and a set of bitmasks, the set of bitmasks comprising bitmasks associated with the plurality of classified data patterns, bitmasks associated with a plurality of transition links of the FSM, the bitmasks identifying classified data patterns that share a relevant transition link, and bitmasks associated with a plurality of nodes of the FSM, each bitmask identifying data patterns exiting at a relevant node.

13. The system of claim 10 wherein the validation engine is to validate each of the found sets of data by
applying a list of validators to remaining candidates to eliminate additional false positives.

14. The system of claim 10 wherein the validators comprise one or more of a checksum algorithm, a check against valid ranges of numbers within a personal identifier candidate, a check against invalid ranges of numbers within a personal identifier candidate, a check against invalid personal identifiers, a check for a valid prefix of a personal identifier candidate, a check for a valid suffix of a personal identifier candidate, a check for a valid format of a personal identifier candidate, a check for valid digits within a personal identifier candidate, a check for a valid number of digits or characters within a personal identifier candidate, or a search of the document for one or more keywords.

15. A non-transitory computer readable storage medium that provides instructions, which when executed on a processing system cause the processing system to perform a method comprising:
storing, in memory, a plurality of classified data patterns for personal identifiers, the plurality of classified data patterns corresponding to variations of personal identifier formats, the personal identifiers including confidential information of a plurality of entities;
identifying a text document to be searched;
searching the text document for data expressed in a format that matches any of the plurality of classified data patterns corresponding to the variations of personal identifier formats;
finding, in the text document, one or more sets of data having the format that matches any of the plurality of classified data patterns, each found set of data representing a possible candidate of a personal identifier; and
validating each of the found sets of data from the text document using one or more personal identifier validators to determine whether the found set of data is a personal identifier or a false positive, wherein validating each of the found sets of data from the text document comprises:
eliminating false positives based on data immediately preceding or following each of the personal identifier candidates, wherein the data immediately preceding or following a personal identifier candidate indicates a false positive if the personal identifier candidate is immediately preceded, or immediately followed by, a number or a letter.

16. The non-transitory computer readable storage medium of claim 15 wherein:
the personal identifiers comprises one or more of a credit card number, a social security number, an account number, an employee number, a customer or patient number, an IP address, a driver license number, and a license plate number;
a list of the plurality of classified data patterns is configurable based on user input; and
a list of the validators is configurable based on user input.

17. The non-transitory computer readable storage medium of claim 15 wherein searching the text document comprises:
performing a search for the plurality of classified data patterns in parallel using a single finite state machine (FSM) and a set of bitmasks, the set of bitmasks comprising bitmasks associated with the plurality of classified data patterns, bitmasks associated with a plurality of transition links of the FSM, the bitmasks identifying classified data patterns that share a relevant transition link, and bitmasks associated with a plurality of nodes of the FSM, each bitmask identifying data patterns exiting at a relevant node.

18. The non-transitory computer readable storage medium of claim 15 wherein validating each of the found sets of data comprises:
applying a list of validators to remaining candidates to eliminate additional false positives.

19. The non-transitory computer readable storage medium of claim 15 wherein the validators comprise one or more of a checksum algorithm, a check against valid ranges of numbers within a personal identifier candidate, a check against invalid ranges of numbers within a personal identifier candidate, a check against invalid personal identifiers, a check for a valid prefix of a personal identifier candidate, a check for a valid suffix of a personal identifier candidate, a check for a valid format of a personal identifier candidate, a check for valid digits within a personal identifier candidate, a check for a valid number of digits or characters within a personal identifier candidate, or a search of the document for one or more keywords.

* * * * *